(12) United States Patent
Lee et al.

(10) Patent No.: US 12,316,439 B2
(45) Date of Patent: *May 27, 2025

(54) SYNCHRONIZATION SIGNAL TRANSMISSION TECHNIQUES

(71) Applicant: APPLE INC., Cupertino, CA (US)

(72) Inventors: Dae Won Lee, Portland, OR (US); Seunghee Han, San Jose, CA (US); Gregory V. Morozov, Nizhny Novgorod (RU); Alexei Davydov, Nizhny Novgorod (RU); Hong He, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,323

(22) Filed: Aug. 30, 2023

(65) Prior Publication Data

US 2023/0403074 A1 Dec. 14, 2023

Related U.S. Application Data

(63) Continuation of application No. 17/447,463, filed on Sep. 13, 2021, now Pat. No. 11,764,869, which is a
(Continued)

(51) Int. Cl.
*H04J 3/00* (2006.01)
*H04B 7/26* (2006.01)
(Continued)

(52) U.S. Cl.
CPC ......... *H04B 7/2656* (2013.01); *H04B 7/2681* (2013.01); *H04L 27/2666* (2013.01); *H04W 56/0015* (2013.01)

(58) Field of Classification Search
CPC .. H04B 7/2656; H04B 7/2681; H04B 7/2643; H04L 27/2666; H04W 56/0015; H04W 74/04; H04W 72/0446; H04W 28/04
See application file for complete search history.

(56) References Cited

U.S. PATENT DOCUMENTS

| 10,389,567 B2 | 8/2019 | Si et al. |
| 10,615,897 B2 | 4/2020 | Islam et al. |

(Continued)

FOREIGN PATENT DOCUMENTS

| ES | 2910793 T3 | 5/2022 |
| WO | 2018129196 A1 | 7/2018 |

OTHER PUBLICATIONS

Sharp, DL Synchronization Signal Structure in NR, Nov. 14-18, 2016, 3GPP TSG RAN WG1 Meeting #87, R1-1612621m pp. 1-4. (Year: 2016).*

(Continued)

*Primary Examiner* — Phuongchau Ba Nguyen
(74) *Attorney, Agent, or Firm* — Dorsey & Whitney LLP

(57) ABSTRACT

Systems and methods for synchronizing communications between a User Equipment (UE) and Base Station (BS) using a synchronization signal structure. The synchronization signal structure can include a sequence of Synchronization Signals (SS) including repetitions of a synchronization signal burst set. The synchronization signal burst set can include a plurality of synchronization signal bursts. The synchronization signal bursts can include a plurality of synchronization signal blocks, wherein the synchronization signal blocks can include a plurality of Synchronization Signals (SS).

18 Claims, 12 Drawing Sheets

Related U.S. Application Data continuation of application No. 16/349,960, filed as application No. PCT/US2018/012398 on Jan. 4, 2018, now Pat. No. 11,121,768.

(60) Provisional application No. 62/444,248, filed on Jan. 9, 2017.

(51) Int. Cl.
*H04L 27/26* (2006.01)
*H04W 56/00* (2009.01)

(56) References Cited

U.S. PATENT DOCUMENTS

| | | |
|---|---|---|
| 10,879,990 B1 | 12/2020 | Zhu et al. |
| 11,121,768 B2 | 9/2021 | Lee et al. |
| 11,678,206 B2 | 6/2023 | Harada et al. |
| 11,764,869 B2 * | 9/2023 | Lee .................. H04W 56/0015 370/337 |
| 2009/0011762 A1 | 1/2009 | Han et al. |
| 2014/0086217 A1 | 3/2014 | Park et al. |
| 2014/0133395 A1 | 5/2014 | Nam et al. |
| 2015/0223245 A1 | 8/2015 | Cheng et al. |
| 2016/0066291 A1 | 3/2016 | Awad et al. |
| 2017/0373900 A1 | 12/2017 | Adhikary et al. |
| 2018/0084593 A1 * | 3/2018 | Chen .................. H04W 76/11 |
| 2018/0123849 A1 * | 5/2018 | Si ..................... H04L 27/2613 |
| 2018/0176065 A1 | 6/2018 | Deng et al. |
| 2018/0198659 A1 * | 7/2018 | Ko ..................... H04L 27/2602 |
| 2018/0227867 A1 | 8/2018 | Park et al. |
| 2018/0254796 A1 | 9/2018 | Akkarakaran et al. |
| 2018/0279271 A1 * | 9/2018 | Sadiq .................. H04W 72/23 |
| 2018/0324623 A1 * | 11/2018 | Jung .................... H04W 24/10 |
| 2018/0324843 A1 | 11/2018 | Lee et al. |
| 2019/0058517 A1 | 2/2019 | Kang et al. |
| 2019/0319699 A1 | 10/2019 | Lee |
| 2019/0327650 A1 * | 10/2019 | Yiu ..................... H04W 36/06 |
| 2019/0327710 A1 * | 10/2019 | Liu ..................... H04W 68/04 |
| 2019/0387441 A1 * | 12/2019 | Koskela ............ H04W 36/0077 |
| 2020/0037273 A1 | 1/2020 | Yokomakura et al. |
| 2020/0404617 A1 | 12/2020 | Murray et al. |
| 2021/0029650 A1 | 1/2021 | Cirik et al. |
| 2021/0266844 A1 | 8/2021 | Zhou et al. |
| 2021/0409111 A1 | 12/2021 | Lee et al. |
| 2022/0007344 A1 | 1/2022 | Sadiq et al. |
| 2023/0276388 A1 | 8/2023 | Hu et al. |
| 2023/0345390 A1 * | 10/2023 | Yin .................... H04B 7/15528 |

OTHER PUBLICATIONS

U.S. Appl. No. 16/349,960, Non-Final Office Action, Dec. 11, 2020, 18 pages.
U.S. Appl. No. 16/349,960, Notice of Allowance, May 4, 2021, 11 pages.
U.S. Appl. No. 17/447,463, Non-Final Office Action, Jan. 3, 2023, 22 pages.
U.S. Appl. No. 17/447,463, Notice of Allowance, May 4, 2023, 10 pages.
Intel Corporation, "Considerations for Synchronization Signal Design", R1-1611963, 3rd Generation Partnership Project, Reno, Nevada, Nov. 6, 2016.
Nokia, et al., "On NR synchronization signal periodicity", R1-1612804, 3rd Generation Partnership Project, Reno, Nevada, Nov. 4, 2016.
PCT/US2018/012398, International Search Report and Written Opinion, Apr. 17, 2018, 11 pages.
Sharp, "DL Synchronization Signal Structure in NR", R1-1612621, 3rd Generation Partnership Project, Reno, Nevada, Nov. 4, 2016.
U.S. Appl. No. 18/458,343, Non-Final Office Action, Apr. 19, 2024, 18 pages.
U.S. Appl. No. 18/458,343, Non-Final Office Action, Sep. 30, 2024, 14 pages.
U.S. Appl. No. 18/458,343, Notice of Allowance, Mar. 26, 2025, 12 pages.

* cited by examiner

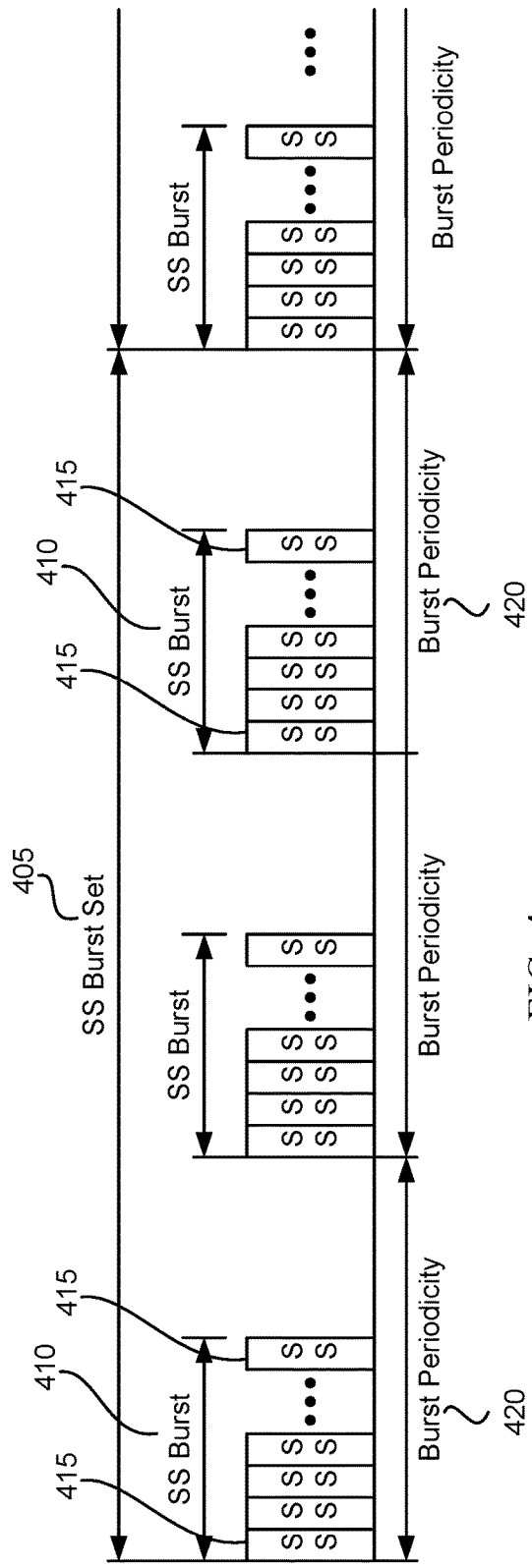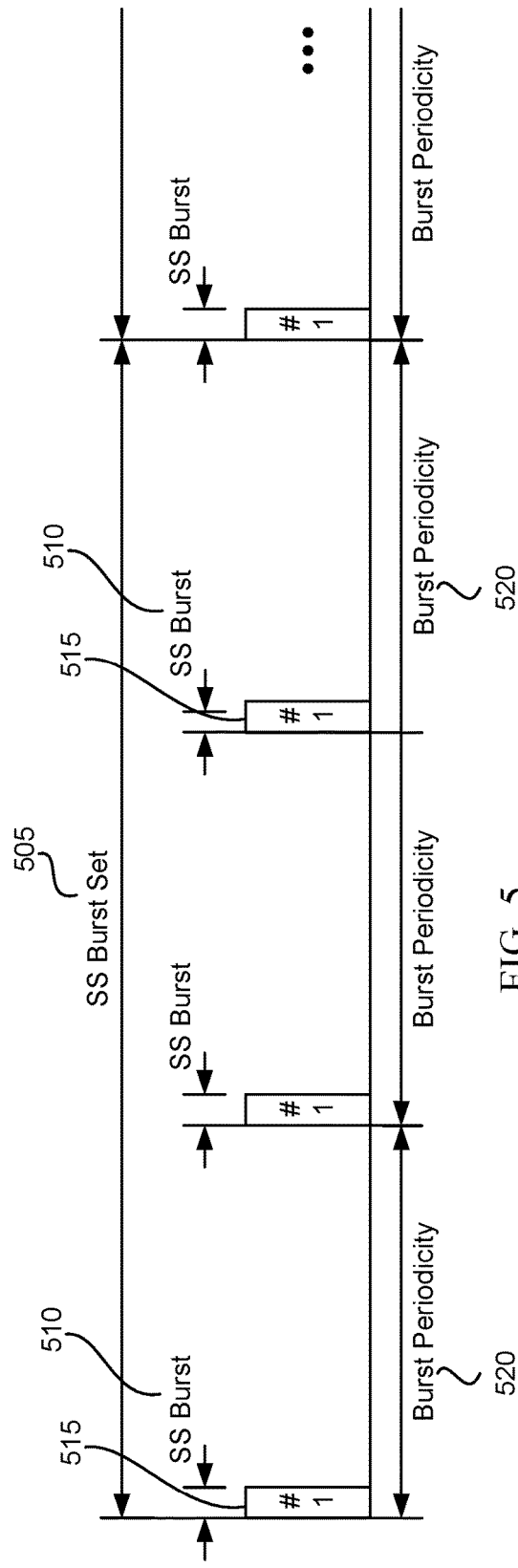

SYNCHRONIZATION SIGNAL TRANSMISSION TECHNIQUES

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network. The UE devices can be one or more of a smart phone, a tablet computing device, a laptop computer, an internet of things (IOT) device, and/or another type of computing devices that is configured to provide digital communications. As used herein, digital communications can include data and/or voice communications, as well as control information.

As part of the process of establishing communication between a UE and a BS, the BS can transmit a Synchronization Signal (SS) on one or more beams. The UE can search a plurality of frequency ranges to detect the Synchronization Signal (SS). To transfer data correctly, the UE can perform a synchronization with a BS based on the Synchronization Signal (SS). From a detected Synchronization Signal (SS), the UE can estimate a Carrier Frequency Offset (CFO), estimate Orthogonal Frequency-Division Multiplexing (OFDM) symbol timing and possibly find the transmission subframe boundary. The transmission subframe refers to the smallest number of groups of OFDM symbols that can be used for control and data transmission. This can be considered as a scheduling unit.

As NR communication systems continue to evolve there is a continuing need for improving the methods and systems for establishing communications between a UE device and a BS.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 illustrates a Synchronization Signal sequence in accordance with an aspect;

FIG. 5 illustrates a Synchronization Signal sequence in accordance with an aspect;

Figure 1:
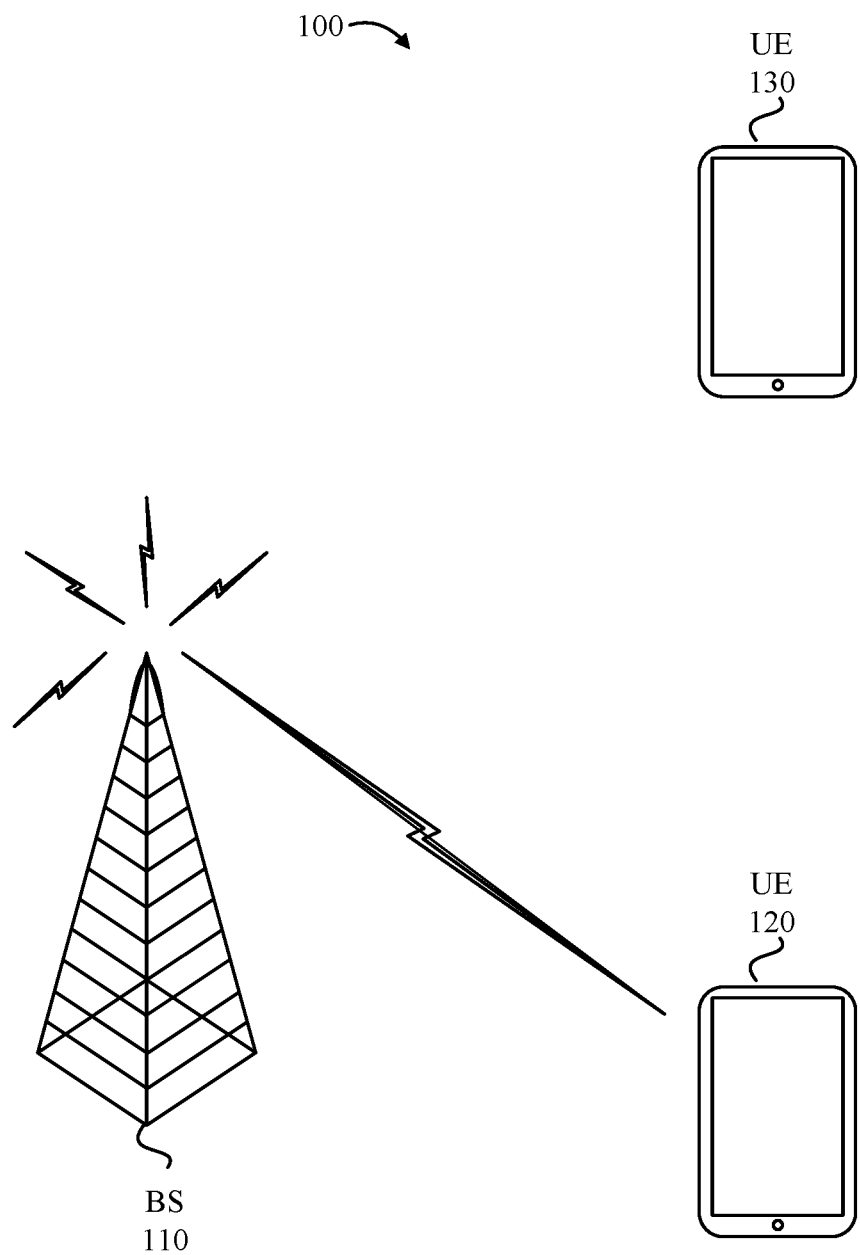
FIG. 1 illustrates a wireless system in accordance with an aspect.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch©, or other type computing device that provides text or voice communication. The term "User Equipment (UE)" may also be refer to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP), and will be referred to herein simply as "New Radio (NR)."

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Further described herein are processes and systems for synchronizing communications between one or more Base Stations (BS) and one or more User Equipment (UE)

devices. In one aspect, a Base Stations (BS) can include a memory interface and one or more processors. The memory interface can be configured to access data for synchronization parameters stored in a memory that specify a repeating structure for a Synchronization Signal (SS). The one or more processors of the Base Stations (BS) can be configured to encode Synchronization Signals (SS) based on the synchronization parameters stored in memory and accessed by the memory interface for use by the one or more processors. The Synchronization Signals (SS) can be encoded for periodic transmission in one or more synchronization signal blocks (SSBs). Multiple synchronization signal blocks in series can form a synchronization signal burst. Multiple synchronization signal busts can form a synchronization signal burst set.

In one aspect, a User Equipment (UE) device can include a memory interface and one or more processors. The memory interface can be configured to access synchronization parameters stored in memory that specify a repeating structure of a synchronization signal. The one or more processors of the User Equipment (UE) device can be configured to decode Synchronization Signals (SS) for one or more beams transmitted by a Base Station (BS) based on the access synchronization parameters. The structure of the encoded Synchronization Signals (SS) can include one or more synchronization signal blocks. Multiple synchronization signal blocks can form a synchronization signal burst. Multiple synchronization signal bursts can form a synchronization signal burst set. The one or more processors of the User Equipment (UE) device can further be configured to determine a Carrier Frequency Offset (CFO) and optionally one or more of an Orthogonal Frequency-Division Multiplexing (OFDM) symbol timing, a transmission subframe boundary, and a Sector Identifier from the decoded Synchronization Signals (SS) for use in synchronizing communication with the Base Station (BS).

FIG. 1 illustrates a wireless system in accordance with an aspect. In one aspect, the wireless system 100 includes one or more Base Stations (BS) 110 and one or more User Equipment (UE) devices 120, 130 that can be communicatively coupled by a wireless communication protocol. In one instance, the one or more Base Stations (BS) 110 may be Long Term Evolution (LTE) evolved NodeBs (eNB) that can be communicatively coupled to one or more UEs by a Third-Generation Partnership Project (3GPP) Long Term Evolution (LTE) network. In one instance, the User Equipment (UE) devices 120, 130 can be one or more of a smart phone, a tablet computing device, a laptop computer, an internet of things (IOT) device, and/or another type of computing devices that is configured to provide digital communications. As used herein, digital communications can include data and/or voice communications, as well as control information. As illustrated in the example of FIG. 1, a first User Equipment (UE) device 120 is already connected to the Base Station (BS) 110, and a second User Equipment (UE) device 130 has not yet established communication with the Base Station (BS) 110. Before, a given User Equipment (UE) device 130 can communicate with a Base Station (BS) 110, the User Equipment (UE) device 130 can perform a cell search procedure that includes a transmission timing adjustment used to synchronize communications between the Base Station (BS) 110 and the User Equipment (UE) device 130.

Figure 2:
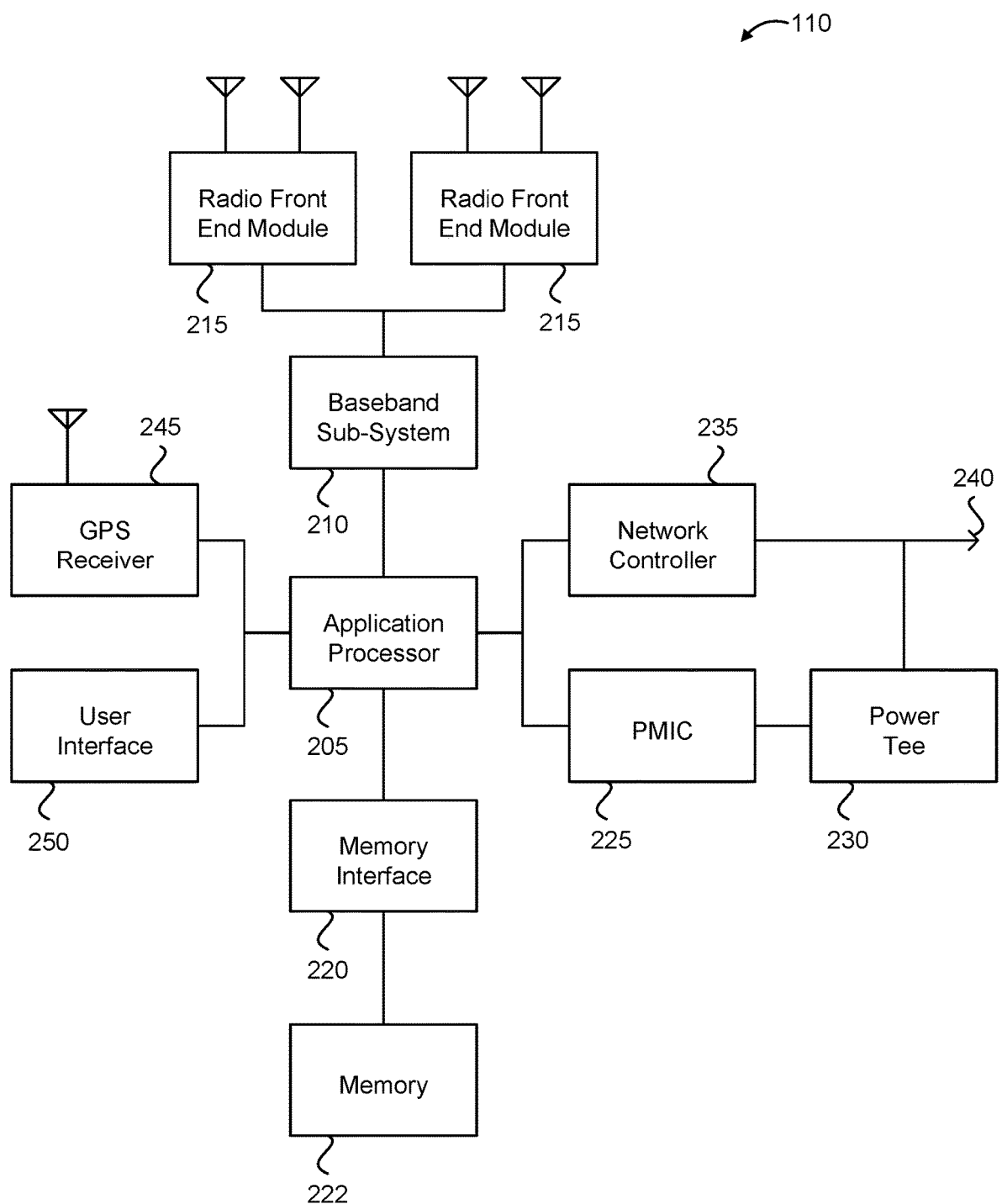
FIG. 2 illustrates a Base Station (BS) in accordance with an aspect.

FIG. 2 illustrates a Base Station (BS) or infrastructure equipment radio head 110 in accordance with an aspect. The Base Station (BS) 110 may include one or more of an application processor 205, a baseband processor sub-system 210, one or more radio front end modules 215, a memory interface 220, a memory 222, power management circuitry 225, power tee circuitry 230, a network controller 235, a network interface connector 240, a satellite navigation receiver 245, or a user interface 250.

In some aspects, the application processor 205 may include one or more CPU cores and one or more of cache memory, low drop-out voltage regulators (LDOs), interrupt controllers, serial interfaces such as a Serial Peripheral Interface (SPI), Inter-Integrated (I2C) or a universal programmable serial interface, a real time clock (RTC), timer-counters including interval and watchdog timers, a general purpose IO, memory card controllers such as a Secure Digital Multi Media Card (SD/MMC) or similar, universal serial bus (USB) interfaces, Mobile Industry Processor Interface (MIPI) and Joint Test Access Group (JTAG) test access ports.

In some aspects, the baseband processor sub-system 210 may be implemented, for example, as a solder-down substrate including one or more integrated circuits, a single packaged integrated circuit soldered to a main circuit board or a multi-chip module containing two or more integrated circuits.

In some aspects, memory 222 may include one or more of volatile memory including dynamic random-access memory (DRAM) and/or synchronous dynamic random-access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 222 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the Base Station (BS) 110 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, the user interface 250 may include one or more of physical or virtual buttons, such as a reset button, one or more indicators such as light emitting diodes (LEDs) or a display screen.

Figure 3:
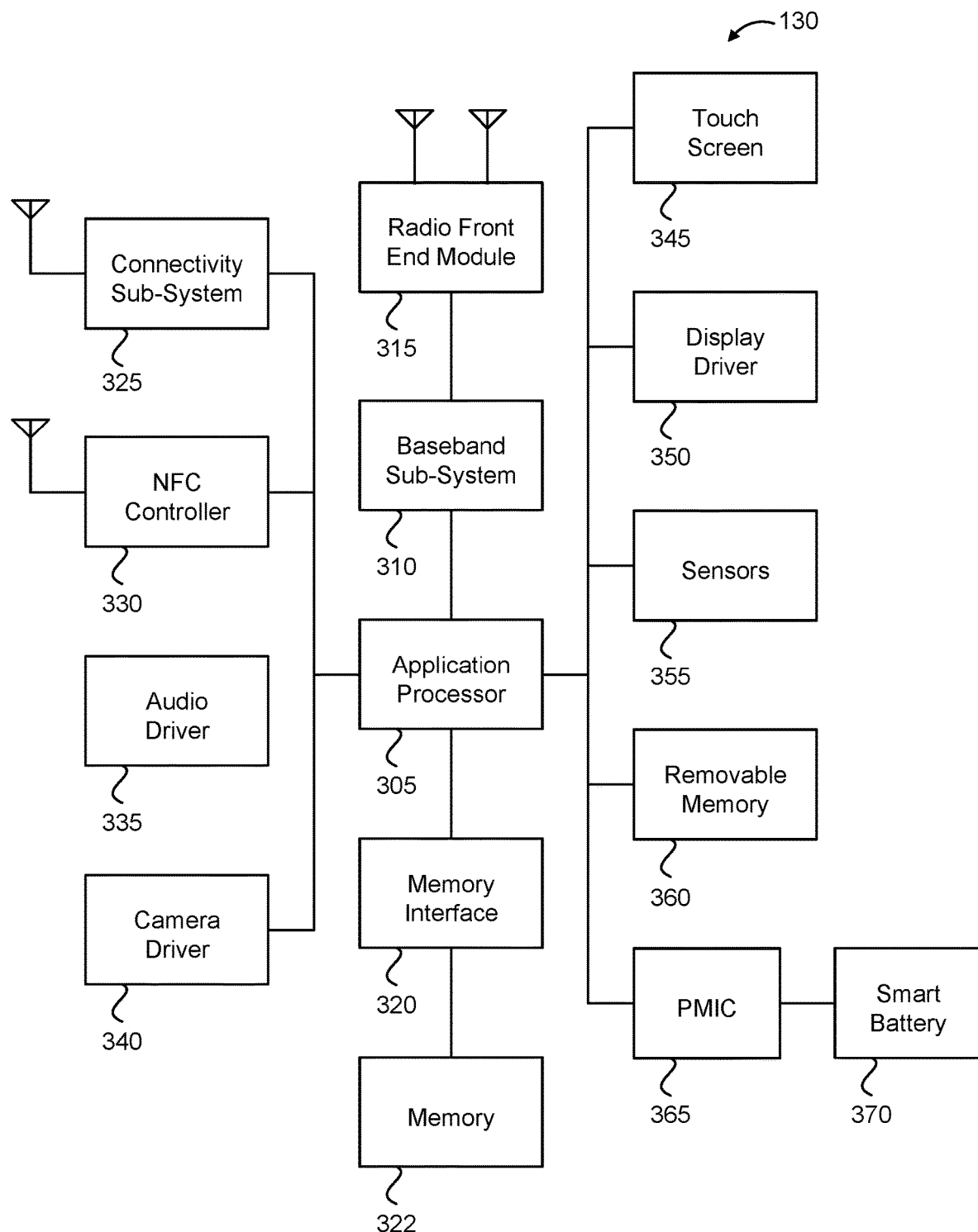
FIG. 3 illustrates a User Equipment (UE) device in accordance with an aspect.

FIG. 3 illustrates a User Equipment (UE) device 130 in accordance with an aspect. The User Equipment (UE) device 130 may be a mobile device in some aspects and includes an application processor 305, baseband processor sub-system 310 (also referred to as a baseband processor sub-system), a radio front end module (RFEM) 315, a memory interface 320, a memory 322, a connectivity sub-system 325, a near field communication (NFC) controller 330, an audio driver 335, a camera driver 340, a touch screen 345, a display driver 350, sensors 355, removable memory 360, power management integrated circuit (PMIC) 365 and a smart battery 370.

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor sub-system 310 may be implemented, for example, as a solder-down substrate including one or more integrated circuits, a single packaged integrated circuit soldered to a main circuit board, and/or a multi-chip module containing two or more integrated circuits.

The Base Station (BS) 110 can be operable to transmit Synchronize Signals (SS) on one or more beams. The Synchronization Signals (SS) are utilized by the User Equipment (UE) device 130 to synchronize communication with the Base Station (BS) 110. In some aspects, the one or more processors 205 of the Base Station (BS) 110 can be configured to encode Synchronization Signals (SS) in a sequence. The sequence of Synchronization Signals (SS) can be encoded for one or more beams according to the one or more synchronization parameters stored in memory 222 and accessed by the memory interface 220 for use by the one or more processors 205. As illustrated in FIG. 4, the sequence of Synchronization Signals (SS) can include repetitions of a synchronization signal burst set 405. The synchronization signal burst set 405 can include a plurality of synchronization signal bursts 410. The synchronization signal bursts 410 can include a plurality of synchronization signal blocks 415. The synchronization signal blocks 415 can include a plurality of Synchronization Signals (SS).

In some aspects, the synchronization parameters can include the burst periodicity 420 of the synchronization signal, and the duration of the synchronization signal burst set 405. In some implementations, the number of synchronization signal blocks 415 in the synchronization signal bursts 410 can be the same. In some implementations, the relative transmission timing of the synchronization signal blocks 415 in synchronization signal bursts 410 can be the same between two synchronization signal bursts 410. In some implementations, the interval between a starting time of consecutive synchronization signal bursts 410 is fixed.

In some aspect, the Synchronization Signals (SS) can include a Primary Synchronization Signal (PSS) and a Secondary Synchronization Signal (SSS). The Synchronization Signals (SS) can also include a Tertiary Synchronization Signal (TSS). The Synchronization Signals (SS) can also include a Physical Broadcast Channel (PBCH). In some implementations, the beams utilized for the Secondary Synchronization Signal (SSS) can be different in different instance of the synchronization signal blocks 415 within a synchronization burst set 405, and the same synchronization signal blocks 415 can be repeater across the synchronization signal burst set 405.

Initial access for New Radio (NR) cells can provide flexible support of antenna array and panel configurations, as well as beam forming techniques. This may imply that the number of beams the New Radio (NR) cell cycles through may be dependent on a given deployment scenario, and network operators may trade-off between the number of network beams and synchronization signal overhead. At the same time, it can be equally important to limit the blind detections or measurement complexity from supporting too many varying configurations of the synchronization signal.

In an exemplary trade-off between network configuration flexibility and the reduction for the User Equipment (UE) device 130 cell search complexity, the burst periodicity 420 and the synchronization signal burst set 405 duration can be fixed. In such case, the network can have the flexibility to configure a varying number of synchronization signal blocks 415 within a synchronization signal burst 410. However, in such a case, the network can configure the same number of synchronization signal blocks 415 within a synchronization signal burst 410, such that the periodicity between any two synchronization signal blocks 415 is a fixed interval.

In a first example, as illustrated in FIG. 5, a synchronization signal burst 510 can include one synchronization signal block 515. The synchronization signal burst 510 can be repeated with a burst periodicity 520. The synchronization signal burst set 505 can include a plurality of synchronization signal bursts 510. The synchronization signal burst set 505 can be repeated indefinitely.

Figure 6:
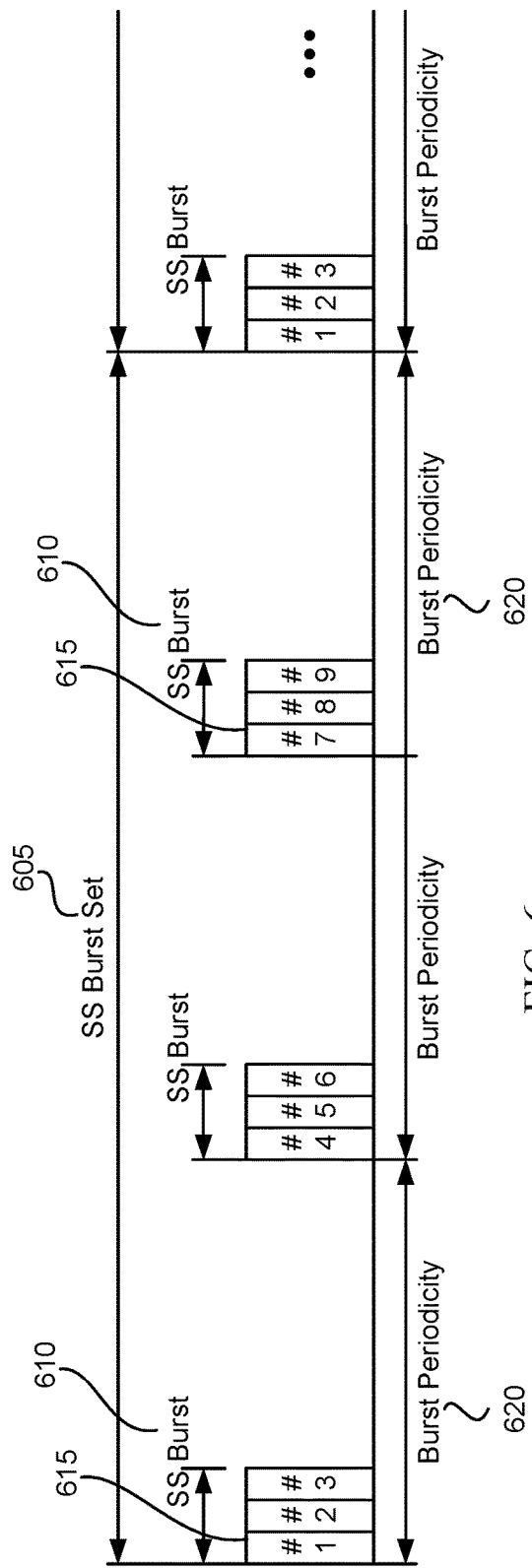
FIG. 6 illustrates a Synchronization Signal sequence in accordance with an aspect.

In a second example, as illustrated in FIG. 6, a synchronization signal burst 610 can include the same number of a plurality of synchronization signal blocks 615. The synchronization signal blocks can be transmitted on respective beams. In one implementation, a synchronization signal block can be transmitted on a first subset (#1-3) of a plurality of beams (#1-9) in a first synchronization signal burst, a second subset (#4-6) of the plurality of beams in a second synchronization signal burst, and a third subset (#7-9) of the plurality of beams in a third synchronization signal burst of a synchronization signal burst set. The synchronization signal burst 610 can be repeated with a burst periodicity 620. The synchronization signal burst set 605 can include a plurality of synchronization signal bursts 610. The synchronization signal burst set 605 can be repeated indefinitely.

Figure 7:
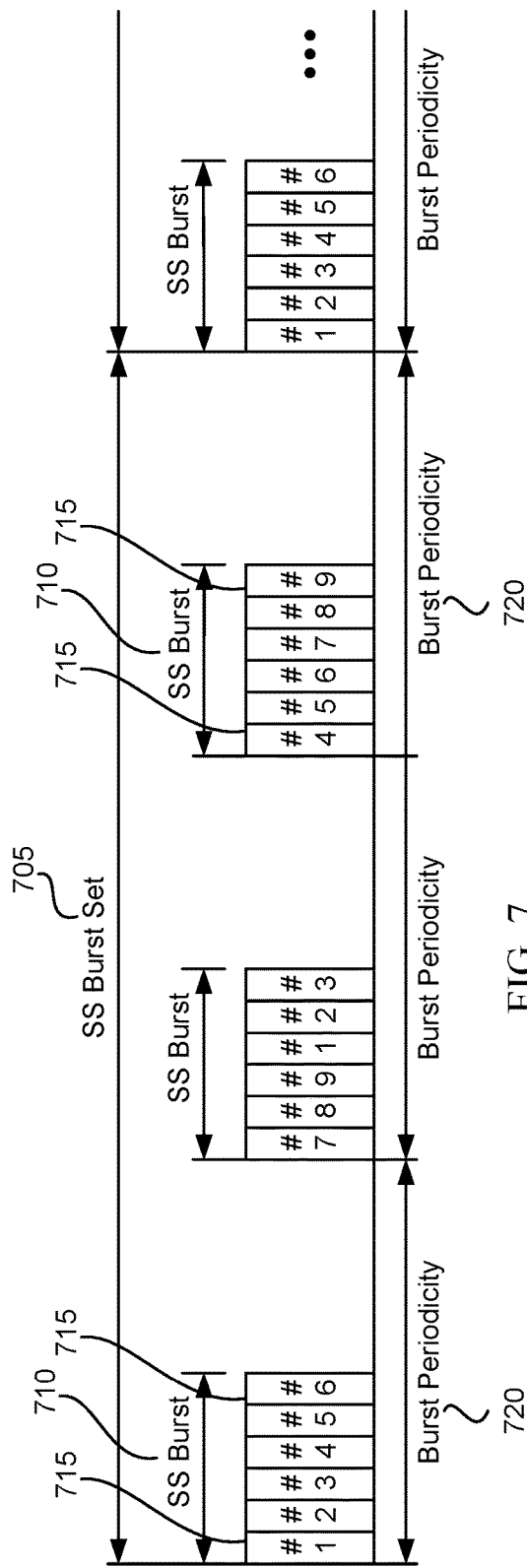
FIG. 7 illustrates a Synchronization Signal sequence in accordance with an aspect.

In a third example, as illustrated in FIG. 7, a synchronization signal burst 710 can include the same number of a plurality of synchronization signal blocks 715. The synchronization signal blocks can be transmitted on respect beams. In one implementation, a synchronization signal block can be transmitted on a first and second subset (#1-3 and 4-6) of a plurality of beams (#1-9) in a first synchronization signal burst, a third subset (#7-9) and the first subset (#1-3) of the plurality of beams in a second synchronization signal burst, and the second and third subset (#4-6 and 7-9) of the plurality of beams in a third synchronization signal burst of a synchronization signal burst set. The synchronization signal burst 710 can be repeated with a burst periodicity 720. The synchronization signal burst set 705 can include a plurality of synchronization signal bursts 710. The synchronization signal burst set 705 can be repeated indefinitely.

The number of synchronization signal blocks 715 within a synchronization signal burst 710 can be left to implementation. However, the number of synchronization signal blocks 715 for each synchronization signal burst 710 can be the same for all synchronization signal burst 710. Furthermore, the time interval between any two synchronization signal blocks from adjacent synchronization signal burst should be fixed.

The beams used for Secondary Synchronization Signal and other signals in the synchronization signal block 615 do not necessarily have to be repeated within synchronization signal burst set 605 periods for any instance of the synchronization signal block 615, which is illustrated in FIG. 6. Additionally, the same beams can be utilized in one or more instances of synchronization signal blocks 715 within the synchronization signal burst set 705 periods, as illustrated in FIG. 7.

Figure 8:
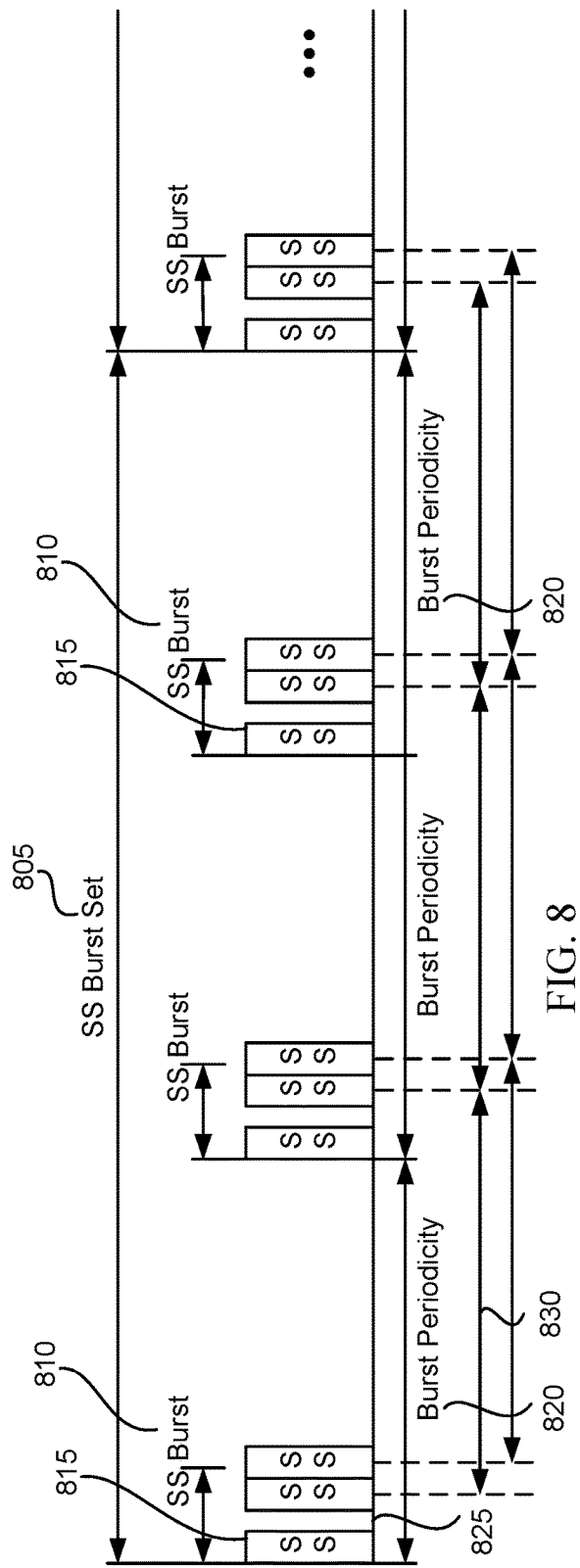
FIG. 8 illustrates a Synchronization Signal sequence in accordance with an aspect.
Figure 9:
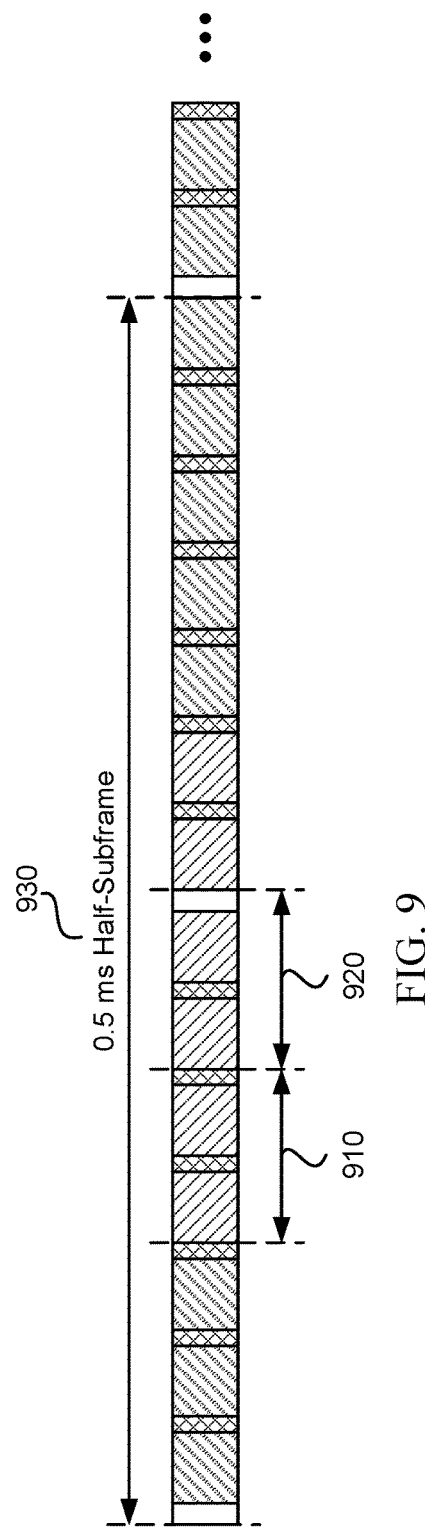
FIG. 9 illustrates a subframe structure in accordance with an aspect.

The synchronization signal structure also allows for placing gaps 825 between consecutive synchronization signal blocks 815 within synchronization signal bursts 810. As long as there is a fixed interval 830 between two synchronization signal blocks 815 belonging to adjacent synchronization signal bursts 810, the UE device 120 does not need to perform any additional blind detection. An example is illustrated in FIG. 8, of a synchronization signal structure with time gaps 825 within the synchronization signal burst 810. The time gaps 825 within the synchronization signal bursts 810 can be utilized for synchronization signal burst 810 placement across the 0.5 millisecond (ms) half-subframe boundary, wherein the New Radio (NR) system defines a subframe as 1 ms long. In one implementation, the first OFDM symbol every 0.5 ms interval has a longer Cyclic Prefix (CP) by 15 samples, assuming a 15 kHz subcarrier spacing and Fast Fourier Transform (FFT) size of 2048, compared to other OFDM symbols. Therefore, the two consecutive synchronization signal blocks 815 can be spaced apart differently 910, 920 depending on the position of the synchronization signal blocks 815 within the subframe time boundary 930, which is illustrated in FIG. 9.

Referring again to FIG. 3, the one or more processors 305 of the User Equipment (UE) device 130 can be configured to search a plurality of frequency ranges to detect Synchronization Signals (SS). The one or more processors 305 can also decode a sequence of Synchronization Signals (SS) detected in one or more beams. The Synchronization Signals (SS) can be decoded according to one or more synchronization parameters stored in memory 322 and accessed by the memory interface 320 for use by the one or more processors 305. Again, the sequence of Synchronization Signals (SS) can include repetitions of a synchronization signal burst set 405. The synchronization signal burst set 405 can include a plurality of synchronization signal bursts 410. The synchronization signal bursts 410 can include a plurality of synchronization signal blocks 415. The synchronization signal blocks can include a plurality of Synchronization Signals (SS), as illustrated in FIG. 4.

Again, the number of synchronization signal blocks within a synchronization signal burst can be left to implementation. However, the number of synchronization signal blocks for each synchronization signal burst can be the same for all synchronization signal burst. Furthermore, the time interval between any two synchronization signal blocks from adjacent synchronization signal burst should be fixed. This structure allows User Equipment (UE) devices to perform non-coherent combining of Primary Synchronization Signals, which typically is the complexity bottleneck of the system. This structure provides flexibility to the network to choose how many beams to sweep within the synchronization signal burst set cycle. In order to put an upper limit of beam sweeping using synchronization signal blocks, the synchronization signal burst set duration should be fixed, such that the User Equipment (UE) device knows the same set of beams are in repetition.

Likewise, the synchronization signal structure also allows for placing gaps between consecutive synchronization signal blocks within synchronization signal bursts. As long as there is a fixed interval between two synchronization signal blocks belonging to adjacent synchronization signal bursts, the User Equipment (UE) device does not need to perform any additional blind detection. Time gaps within the synchronization signal bursts can be utilized for synchronization signal burst placement across the 0.5 millisecond (ms) half-subframe boundary, wherein the New Radio (NR) system defines a subframe as 1 ms long. In one implementation, the first OFDM symbol every 0.5 ms interval has a longer Cyclic Prefix (CP) by 15 sample, assuming a 15 kHz subcarrier spacing and Fast Fourier Transform (FFT) size of 2048, compared to other OFDM symbols. Therefore, the two consecutive synchronization signal blocks can be spaced apart differently depending on the position of the synchronization signal blocks within the subframe time boundary. As long as the relative timing among synchronization signal blocks is within a synchronization signal burst is the same between synchronization signal burst, the User Equipment (UE) device can be configured such that instances of synchronization signal blocks will occur at regular time periods. This allows the User Equipment (UE) device to perform non-coherent combining of Primary Synchronization Signals (PSS), while detecting the Secondary Synchronization Signals (SS) of the synchronization signal block. Moreover, because the synchronization signal burst set period can be a fixed interval and the set of synchronization signal blocks are repeated in each synchronization signal burst set period, the User Equipment (UE) device can also perform non-coherent combining of any synchronization signal block components across synchronization signal burst set periods.

The one or more processors 305 of the User Equipment (UE) device 130 can also synchronize with a given Base Station (BS) 110 based on the decoded Synchronization Signals (SS). In some implementations, synchronizing with the given Base Station (BS) 110 can include determining a Carrier Frequency Offset (CFO) from a Primary Synchronization Signal (PSS) of the decoded Synchronization Signals (SS). In some implementations, synchronizing with the given Base Station (BS) 110 can include determining an OFDM symbol timing from the Carrier Frequency Offset (CFO). In some implementations, the one or more processors 305 can be further configured to determine a Sector Identifier (ID) from the Primary Synchronization Signal (PSS).

Figure 10:
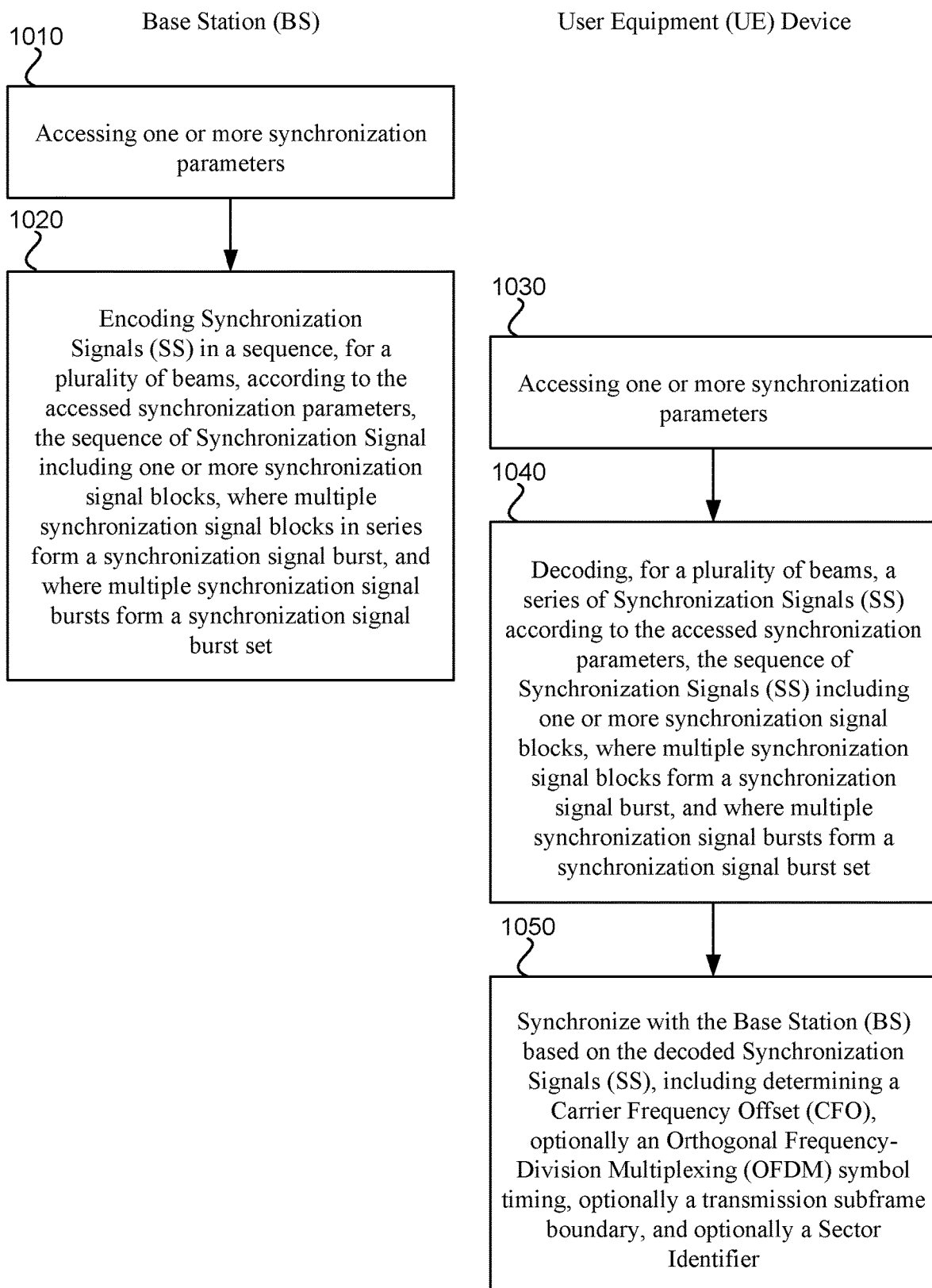
FIG. 10 illustrates a synchronization process between a Base Station (BS) and a User Equipment (UE) device in accordance with an aspect.

FIG. 10 illustrates a synchronization process between a Base Station (BS) and a User Equipment (UE) device in accordance with an aspect. In one aspect, the Base Station (BS) can access one or more synchronization parameters 1010. The synchronization parameters can include parameters for encoding a repeating structure of a synchronization signal. In one aspect, the Base Station (BS) can encoded Synchronization Signals (SS) in a sequence, for a plurality of beams, according to the accessed synchronization parameters 1020. The sequence of Synchronization Signals (SS) can include one or more synchronization signal blocks, where multiple synchronization signal blocks in series form a synchronization signal burst, and where multiple synchronization signal bursts form a synchronization signal burst set, as described above in greater detail with regard to FIGS. 4-9.

In one aspect, the User Equipment (UE) device can access one or more synchronization parameters 1030. The synchronization parameters can include parameters for decoding a repeating structure of a synchronization signal. In one aspect, the User Equipment (UE) device can decode, for a plurality of beams, a sequence of Synchronization Signals (SS) according to the accessed synchronization parameters. The sequence of Synchronization Signals (SS) can again include one or more synchronization signal blocks, where multiple synchronization signal blocks in series form a synchronization signal burst, and where multiple synchronization signal bursts form a synchronization signal burst set, as described above in greater detail with regard to FIGS. 4-9. In one aspect, the User Equipment (UE) device can synchronize with the Base Station (BS) based on the decoded Synchronization Signals (SS). Synchronizing can include determining a Carrier Frequency Offset (CFO) from a Primary Synchronization Signal (PSS) of the decoded Synchronization Signals (SS). Synchronizing can also include determining an OFDM symbol timing from the Carrier Frequency Offset (CFO). Synchronizing can also include determining a Sector Identifier (ID) from the Primary Synchronization Signal (PSS).

Figure 11:
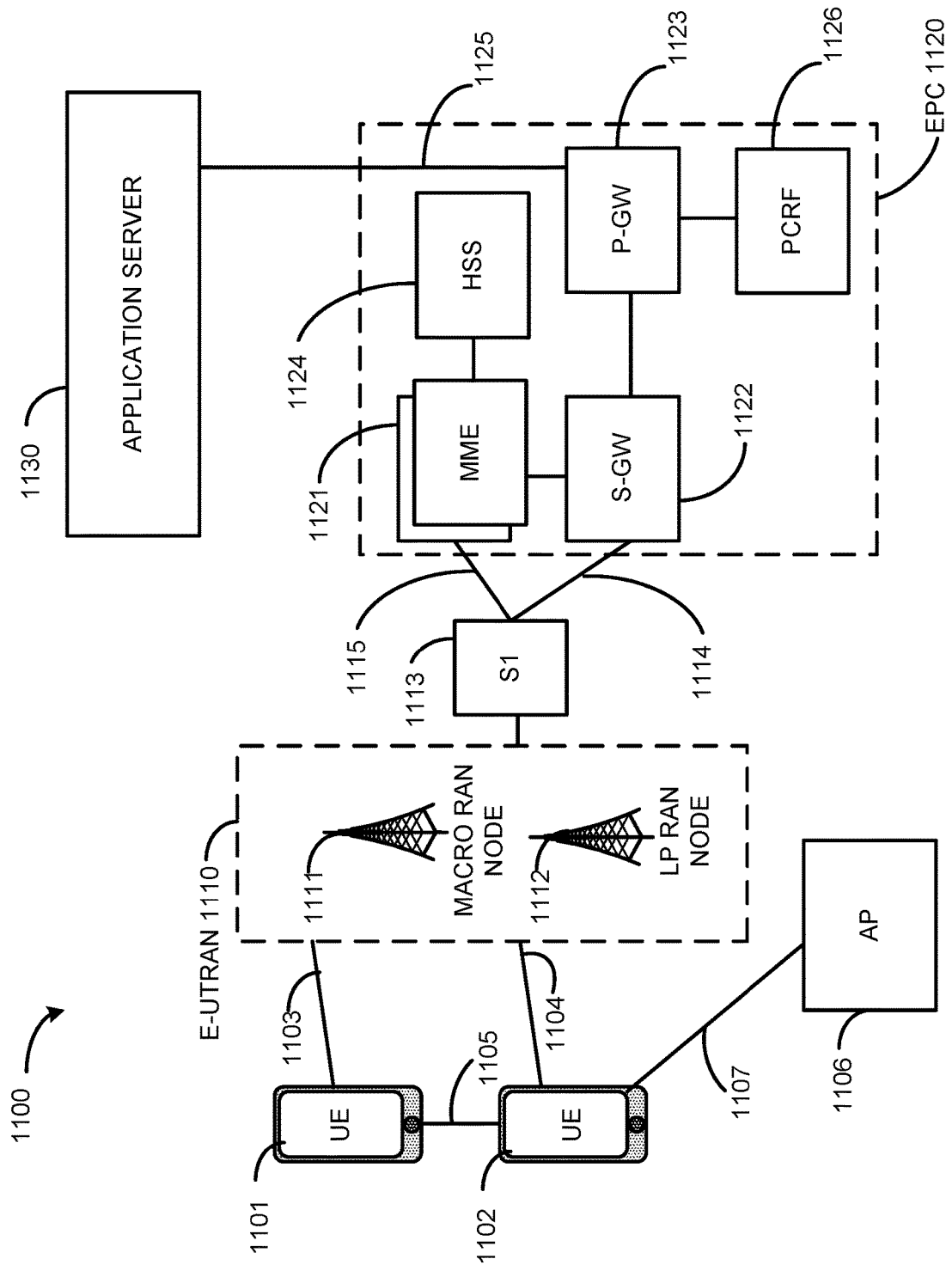
FIG. 11 illustrates an architecture of a wireless network with various components of the network in accordance with an aspect.

FIG. 11 illustrates an architecture of a wireless network with various components of the network in accordance with an aspect. A system 1100 is shown to include a UE 1101 and a UE 1102. The UEs 1101 and 1102 are illustrated as smartphones (i.e., handheld touchscreen mobile computing devices connectable to one or more cellular networks), but may also comprise any mobile or non-mobile computing device, such as Personal Data Assistants (PDAs), pagers, laptop computers, desktop computers, wireless handsets, smart meters, remote sensing devices, or any computing device including a wireless communications interface. In some embodiments, any of the UEs 1101 and 1102 can comprise an Internet of Things (IoT) UE device, which can comprise a network access layer designed for low-power IoT applications utilizing short-lived UE connections. An IoT UE device can utilize technologies such as machine-to-machine (M2M) or machine-type communications (MTC) for (machine initiated) exchanging data with an MTC server and/or device via a public land mobile network (PLMN), Proximity-Based Service (ProSe) or device-to-device (D2D) communication, sensor networks, or IoT networks. An IoT network describes interconnecting uniquely identifiable embedded computing devices (within the internet infrastructure) having short-lived connections, in addition to background applications (e.g., keep-alive messages, status updates, etc.) executed by the IoT UE.

The UEs 1101 and 1102 are configured to access a radio access network (RAN)—in this embodiment, an Evolved Universal Mobile Telecommunications System (UMTS) Terrestrial Radio Access Network (E-UTRAN) 1110. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE device 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi) router. In this example, the AP 1106 is shown to be connected to the Internet without connecting to the core network of the wireless system.

The E-UTRAN 1110 can include one or more access points that enable the connections 1103 and 1104. These access points can be referred to as access nodes, base stations (BSs), NodeBs, RAN nodes, RAN nodes, and so forth, and can comprise ground stations (i.e., terrestrial access points) or satellite access points providing coverage within a geographic area (i.e., a cell). The E-UTRAN 1110 may include one or more RAN nodes 1111 for providing macrocells and one or more RAN nodes 1112 for providing femtocells or picocells (i.e., cells having smaller coverage areas, smaller user capacity, and/or higher bandwidth compared to macrocells).

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the E-UTRAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The physical downlink shared channel (PDSCH) carries user data and higher-layer signaling to the UEs 1101 and 1102. The physical downlink control channel (PDCCH) carries information about the transport format and resource allocations related to the PDSCH channel, among other things. It also informs the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 112 within a cell) is performed at any of the RAN nodes 1111 and 1112 based on channel quality information fed back from any of the UEs 1101 and 1102, and then the downlink resource assignment information is sent on the PDCCH used for (i.e., assigned to) each of the UEs 1101 and 1102.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying (QPSK) symbols are mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

The E-UTRAN 1110 is shown to be communicatively coupled to a core network—in this embodiment, an Evolved Packet Core (EPC) network 1120 via an S1 interface 1113. In this embodiment the S1 interface 1113 is split into two parts: the S1-U interface 1114, which carries traffic data between the RAN nodes 1111 and 1112 and the serving gateway (S-GW) 1122, and the S1-MME interface 1115, which is a signaling interface between the RAN nodes 1111 and 1112 and the mobility management entities (MMEs) 1121.

In this embodiment, the EPC network 1120 comprises the MMEs 1121, the S-GW 1122, the Packet Data Network (PDN) Gateway (P-GW) 1123, and a home subscriber server (HSS) 1124. The MMEs 1121 are similar in function to the control plane of legacy Serving General Packet Radio Service (GPRS) Support Nodes (SGSN). The MMEs 1121 manage mobility aspects in access such as gateway selection and tracking area list management. The HSS 1124 comprises a database for network users, including subscription-related information to support the network entities' handling of communication sessions. The EPC network 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 terminates the S1 interface 1113 towards the E-UTRAN 1110, and routes data packets between the E-UTRAN 1110 and the EPC network 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 terminates an SGi interface toward a PDN. The P-GW 1123 routes data packets between the EPC network 1120 and external networks such as a network including the application server 1130 (alternatively referred to as application function (AF)) via an Internet Protocol (IP) interface 1125. Generally, the application server 1130 is an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the EPC network 1120.

The P-GW 1123 may further be a node for policy enforcement and charging data collection. Policy and Charging Enforcement Function (PCRF) 1126 is the policy and charging control element of the EPC network 1120. In a non-roaming scenario, there may be a single PCRF in the Home Public Land Mobile Network (HPLMN) associated with a User Equipment's (UE) Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and selecting the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server.

Figure 12:
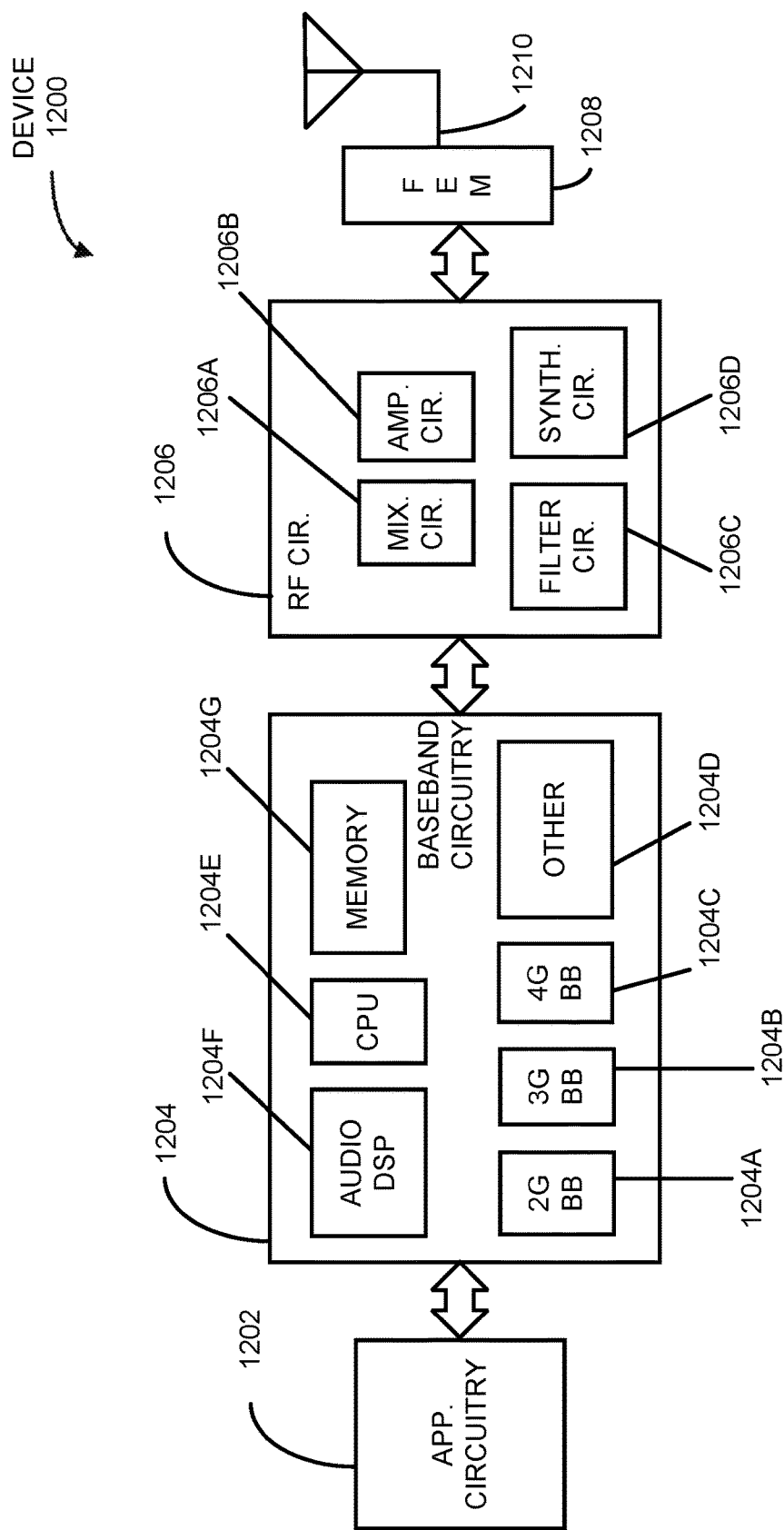
FIG. 12 illustrates example components of a device in accordance with an aspect.

FIG. 12 illustrates example components of a device in accordance with some embodiments. In some embodiments, the device 1200 may include application circuitry 1202, baseband circuitry 1204, Radio Frequency (RF) circuitry 1206, front-end module (FEM) circuitry 1208, and one or more antennas 1210, coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, and/or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors and/or control logic to process baseband signals received from a receive signal path of the RF circuitry 1206 and to generate baseband signals for a transmit signal path of the RF circuitry 1206. Baseband circuitry 1204 may interface with the application circuitry 1202 for generation and processing of the baseband signals and for controlling operations of the RF circuitry 1206. For example, in some embodiments, the baseband circuitry 1204 may include a second generation (2G) baseband processor 1204a, third generation (3G) baseband processor 1204b, fourth generation (4G) baseband processor 1204c, and/or other baseband processor(s) 1204d for other existing generations, generations in development or to be developed in the future (e.g., fifth generation (5G), 6G, etc.). The baseband circuitry 1204 (e.g., one or more of baseband processors 1204a-d) may handle various radio control functions that enable communication with one or more radio networks via the RF circuitry 1206. In other embodiments, some or all of the functionality of baseband processors 1204a-d may be included in modules stored in the memory 1204g and executed via a Central Processing Unit (CPU) 1204e. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, and/or constellation mapping/demapping functionality. In some embodiments, encoding/decoding circuitry of the baseband circuitry 1204 may include convolution, tail-biting convolution, turbo, Viterbi, and/or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204f. The audio DSP(s) 1204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the RF circuitry 1206 may include a receive signal path and a transmit signal path. The receive signal path of the RF circuitry 1206 may include mixer circuitry 1206a, amplifier circuitry 1206b and filter circuitry 1206c. The transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a necessity. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c. The filter circuitry 1206c may include a low-pass filter (LPF), although the scope of the embodiments is not limited in this respect.

In some embodiments, the mixer circuitry 1206a of the receive signal path and the mixer circuitry 1206a of the transmit signal path may include two or more mixers and may be arranged for quadrature downconversion and/or upconversion respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and/or direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a necessity. Divider control input may be provided by either the baseband circuitry 1204 or the application circuitry 1202 depending on the desired output frequency. In some embodiments, a divider control input (e.g., N) may be determined from a look-up table based on a channel indicated by the application circuitry 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210.

In some embodiments, the device 1200 comprises a plurality of power saving mechanisms. If the device 1200 is in an RRC_Connected state, where it is still connected to the RAN node as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device cannot receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, and/or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
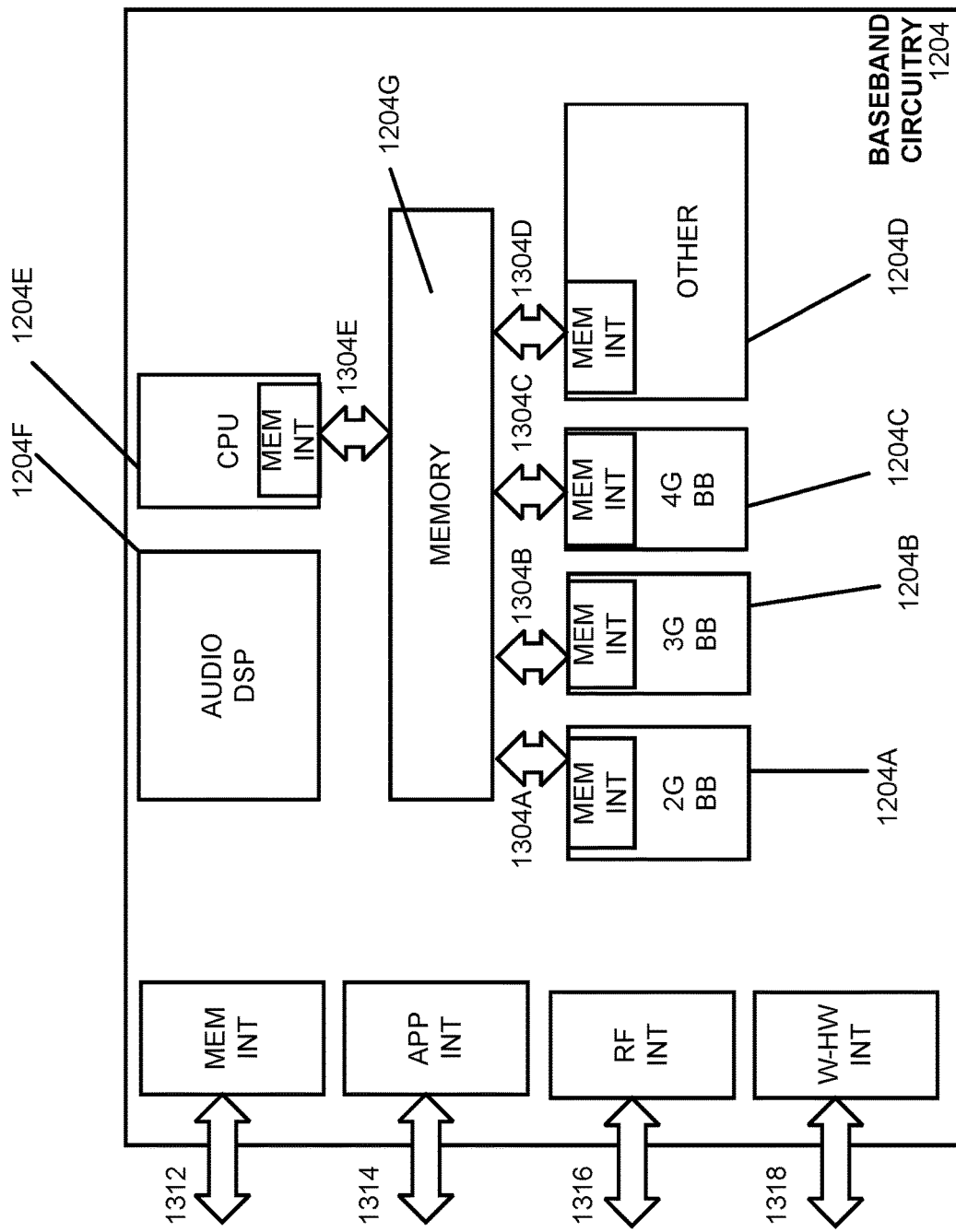
FIG. 13 illustrates example interfaces of baseband circuitry in accordance with an aspect.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), and a wireless hardware connectivity interface 1318 (e.g., an interface to send/receive data to/from Near Field Communication (NFC) components, Bluetooth® components (e.g., Bluetooth® Low Energy), Wi-Fi® components, and other communication components).

Figure 14:
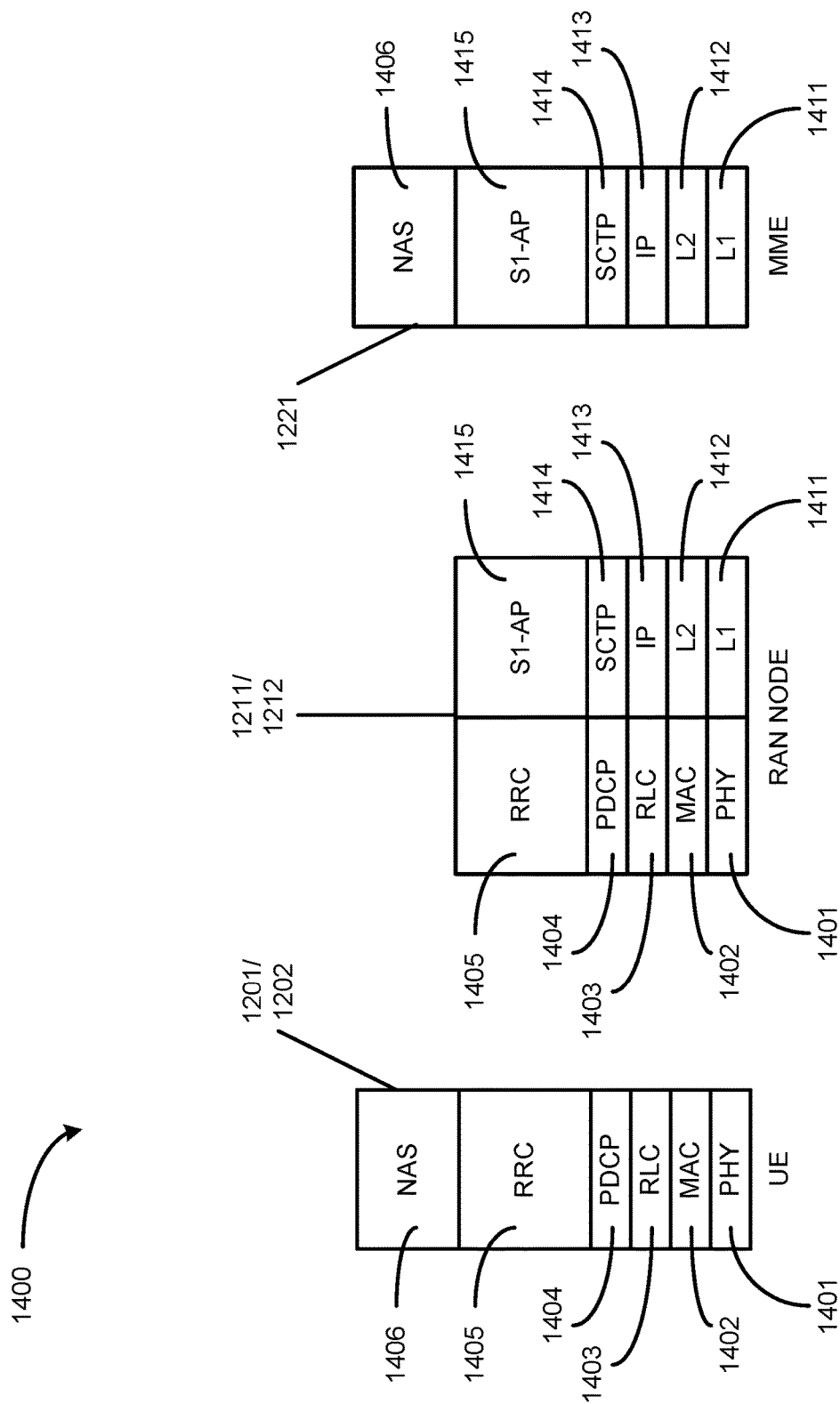
FIG. 14 illustrates a control plane protocol stack in accordance with an aspect.

FIG. 14 is an illustration of a control plane protocol stack in accordance with some embodiments. In this embodiment, a control plane 1400 is shown as a communications protocol stack between the UE 1101 (or alternatively, the UE 1102), the RAN node 1111 (or alternatively, the RAN node 1112) and the MME 1121.

The PHY layer 1401 transmits and/or receives information used by the MAC layer 1402 over one or more air interfaces. The PHY layer 1401 may further perform link adaptation or adaptive modulation and coding (AMC), power control, cell search (e.g., for initial synchronization and handover purposes) and other measurements used by higher layers, such as the RRC layer 1405, error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1402 performs mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1403 may operate in a plurality of modes of operation, including: Transparent Mode (TM), Unacknowledged Mode (UM), and Acknowledged Mode (AM). The RLC layer 1403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, ciphering and deciphering of control plane data, integrity protection and integrity verification of control plane data, timer based discard of data, and security (e.g., ciphering, deciphering, integrity protection, integrity verification, etc.).

The main services and functions of the RRC layer 1405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1101 and the RAN node 1111 may utilize a Uu interface (e.g., an LTE-Uu interface) to exchange control plane data via a protocol stack comprising the PHY layer 1401, the MAC layer 1402, the RLC layer 1403, the PDCP layer 1404, and the RRC layer 1405.

The non-access stratum (NAS) protocols 1406 form the highest stratum of the control plane between the UE 1101 and the MME 1121. The NAS protocols 1406 support the mobility of the UE 1101 and the session management procedures to establish and maintain IP connectivity between the UE 1101 and the P-GW 1123.

The S1 Application Protocol (S1-AP) layer 1415 supports the functions of the S1 interface and comprises Elementary Procedures (EPs). An EP is a unit of interaction between the RAN node 1111 and the EPC network 1120. The S1-AP layer services comprise two groups: UE-associated services and non UE-associated services. These services perform functions including, but are not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1414 ensures reliable delivery of signaling messages between the RAN node 1111 and the MME 1121 based, in part, on the IP protocol, supported by the IP layer 1413. The L2 layer 1412 and the L1 layer 1411 refers to communication links (e.g., wired or wireless) used by the RAN node and the MME to exchange information.

The RAN node 1111 and the MME 1121 may utilize an S1-MME interface to exchange control plane data via a protocol stack comprising the L1 layer 1411, the L2 layer 1412, the IP layer 1413, the SCTP layer 1414, and the S1-AP layer 1415.

Figure 15:
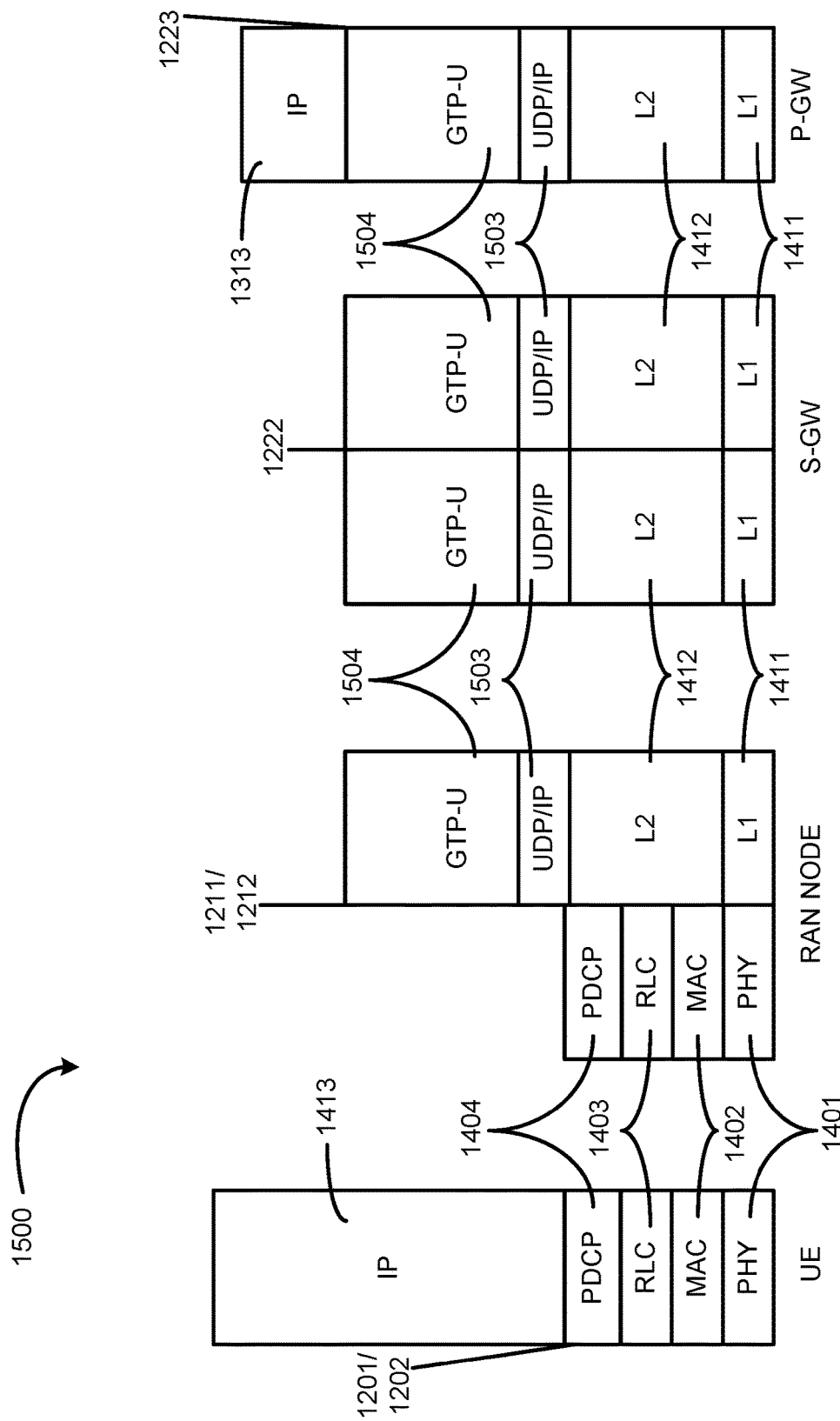
FIG. 15 illustrates a user plane protocol stack in accordance with an aspect.

FIG. 15 is an illustration of a user plane protocol stack in accordance with some embodiments. In this embodiment, a user plane 1500 is shown as a communications protocol stack between the UE 1101 (or alternatively, the UE 1102), the RAN node 1111 (or alternatively, the RAN node 1112), the S-GW 1122, and the P-GW 1123. The user plane 1500 may utilize at least some of the same protocol layers as the control plane 1400. For example, the UE 1101 and the RAN node 1111 may utilize a Uu interface (e.g., an LTE-Uu interface) to exchange user plane data via a protocol stack comprising the PHY layer 1401, the MAC layer 1402, the RLC layer 1403, the PDCP layer 1404.

The General Packet Radio Service (GPRS) Tunneling Protocol for the user plane (GTP-U) layer 1504 may be used for carrying user data within the GPRS core network and between the radio access network and the core network. The user data transported can be packets in any of IPv4, IPv6, or PPP formats. The UDP and IP security (UDP/IP) layer 1503 may provide checksums for data integrity, port numbers for addressing different functions at the source and destination, and encryption and authentication on the selected data flows. The RAN node 1111 and the S-GW 1122 may utilize an S1-U interface to exchange user plane data via a protocol stack comprising the L1 layer 1411, the L2 layer 1412, the UDP/IP layer 1503, and the GTP-U layer 1504. The S-GW 1122 and the P-GW 1123 may utilize an S5/S8a interface to exchange user plane data via a protocol stack comprising the L1 layer 1411, the L2 layer 1412, the UDP/IP layer 1503, and the GTP-U layer 1504. As discussed above with respect to FIG. 14, NAS protocols support the mobility of the UE 1101 and the session management procedures to establish and maintain IP connectivity between the UE 1101 and the P-GW 1123.

Examples

The following examples pertain to specific technology embodiments and point out specific features, elements, or operations that may be used or otherwise combined in achieving such embodiments.

Embodiment 1 includes an apparatus of a User Equipment (UE) of a millimeter wave new radio system operable to synchronize communication with a Base Station (BS), the User Equipment (UE) comprising: a memory interface configured to access synchronization parameters in a memory; and one or more processors configured to; search a plurality of frequency ranges to detect Synchronization Signals (SS); decode, for a plurality of beams, a sequence of Synchronization Signals (SS) according to one or more accessed synchronization parameters, the sequence of Synchronization Signals (SS) including: repetitions of a synchronization signal burst set, the synchronization signal burst set including: a plurality of synchronization signal bursts, the synchronization signal bursts including: a plurality of synchronization signal blocks, the synchronization signal blocks including: a plurality of Synchronization Signals (SS); and synchronize with a given Base Station (BS) based on the decoded Synchronization Signals (SS).

Embodiment 2 includes the apparatus of the User Equipment (UE) according to embodiment 1, wherein the synchronization parameters include the periodicity of the synchronization signal burst set.

Embodiment 3 includes the apparatus of the User Equipment (UE) according to embodiments 1 or 2, wherein the synchronization parameters include the duration of the synchronization signal burst set.

Embodiment 4 includes the apparatus of the User Equipment (UE) according to embodiments 1 or 2, wherein the one or more processors configured to detect Synchronization Signals (SS) includes the one or more processors configured to cross-correlate synchronization signal blocks within synchronization signal burst sets.

Embodiment 5 includes the apparatus of the User Equipment (UE) according to embodiments 1 or 2, wherein a synchronization signal block with a particular synchronization signal block index has a particular periodicity.

Embodiment 6 includes the apparatus of the User Equipment (UE) according to embodiments 1 or 5, wherein synchronization signal blocks with different synchronization signal block index numbers represent Synchronization Signals (SS) transmitted in different time instances over a half radio frame period.

Embodiment 7 includes the apparatus of the User Equipment (UE) according to embodiments 1 or 2, wherein synchronization signal blocks are consecutive within a synchronization signal burst.

Embodiment 8 includes the apparatus of the User Equipment (UE) according to embodiments 1 or 2, wherein the one or more processors configured to synchronize with the given Base Stations (BS) includes the one or more processors configured to determine a Carrier Frequency Offset (CFO) from a Primary Synchronization Signal (PSS) of the decoded Synchronization Signals (SS).

Embodiment 9 includes the apparatus of the User Equipment (UE) according to Embodiment 8, wherein the one or more processors configured to synchronize with the given Base Stations (BS) includes the one or more processors configured to determine an OFDM symbol timing from the Carrier Frequency Offset (CFO).

Embodiment 10 includes the apparatus of the User Equipment (UE) according to Embodiment 8, wherein the one or more processors configured to synchronize with the given Base Stations (BS) includes the one or more processors configured to determine a Sector Identifier (ID) from the Primary Synchronization Signal (PSS).

Embodiment 11 includes the apparatus of the User Equipment (UE) according to embodiment 8, wherein the Synchronization Signal (SS) further includes one or more of a Secondary Synchronization Signal (SSS), a Tertiary Synchronization Signal (TSS), and a Physical Broadcast Channel (PBCH).

Embodiment 12 includes an apparatus of a Base Station (BS) of a millimeter wave new radio system operable to synchronize communication with a User Equipment (UE), the Base Station (BS) comprising: a memory interface configured to access synchronization parameters in a memory; and one or more processors configured to encode Synchronization Signals (SS) in a sequence, for a plurality of beams according to one or more accessed synchronization parameters, the sequence of Synchronization Signals (SS) including: repetitions of a synchronization signal burst set, the synchronization signal burst set including: a plurality of synchronization signal bursts, the synchronization signal bursts including: a plurality of synchronization signal blocks, the synchronization signal blocks including: a plurality of Synchronization Signals (SS).

Embodiment 13 includes the apparatus of the Base Station (BS) according to embodiment 12, wherein the synchronization parameters include the periodicity of the synchronization signal burst.

Embodiment 14 includes the apparatus of the Base Station (BS) according to embodiments 12 or 13, wherein the synchronization parameters include the duration of the synchronization signal burst set.

Embodiment 15 includes the apparatus of the Base Station (BS) according to embodiments 12 or 13, wherein a number of synchronization signal blocks in the synchronization signal bursts is the same according to the one or more accessed synchronization parameters.

Embodiment 16 includes the apparatus of the Base Station (BS) according to embodiments 12 or 13, wherein a relative transmission timing of the synchronization signal blocks in synchronization signal bursts is the same between two synchronization signal bursts according to the one or more accessed synchronization parameters.

Embodiment 17 includes the apparatus of the Base Station (BS) according to embodiments 12 or 13, wherein an interval between a starting time of consecutive synchronization signal bursts is fixed according to the one or more accessed synchronization parameters.

Embodiment 18 includes the apparatus of the Base Station (BS) according to embodiments 12 or 13, wherein the Synchronization Signals (SS) includes a Primary Synchronization Signal (PSS) and a Secondary Synchronization Signal (SSS), and wherein beams utilized for the Secondary Synchronization Signal (SSS) are different in different instances of synchronization signal blocks within a synchronization signal burst set, and the same synchronization signal blocks are repeated across the synchronization signal burst sets according to the one or more accessed synchronization parameters.

Embodiment 19 includes the apparatus of the Base Station (BS) according to embodiments 12 or 13, wherein the Synchronization Signal (SS) includes a Primary Synchronization Signal (PSS) and one or more of a Secondary Synchronization Signal (SSS), a Tertiary Synchronization Signal (TSS), and a Physical Broadcast Channel (PBCH).

Embodiment 20 includes an apparatus of a User Equipment (UE) of a millimeter wave new radio system operable to synchronize communication with one or more Base Stations (BS), the User Equipment (UE) comprising: a memory interface configured to access synchronization parameters in a memory; and one or more processors configured to; decode Synchronization Signals (SS) for one or more beams based on the accessed synchronization parameters, a structure of the encoded Synchronization Signals (SS) including one or more synchronization signal blocks, where multiple synchronization signal blocks form a synchronization signal burst, and where multiple synchronization signal bursts form a synchronization signal burst set; and determine a Carrier Frequency Offset (CFO) from the decoded Synchronization Signals (SS).

Embodiment 21 includes the apparatus of the User Equipment (UE) according to embodiment 20, wherein the one or more processors are further configured to determine a Sector Identifier (ID) from the decoded Synchronization Signals (SS).

Embodiment 22 includes the apparatus of the User Equipment (UE) according to embodiments 20, wherein the synchronization signal burst has a predetermined periodicity.

Embodiment 23 includes the apparatus of the User Equipment (UE) according to embodiments 20 or 22, wherein the synchronization signal burst set has a predetermined duration.

Embodiment 24 includes the apparatus of the User Equipment (UE) according to embodiments 20 or 22, wherein synchronization signal busts include a same number of synchronization signal blocks such that the predetermined periodicity between two synchronization signal blocks is a fixed interval.

Embodiment 25 includes the apparatus of the User Equipment (UE) according to embodiments 20 or 21, wherein the one or more processors are further configured to determine an Orthogonal Frequency Demodulation (OFDM) symbol boundary based on the decoded synchronization signal.

Embodiment 26 includes the apparatus of the User Equipment (UE) according to embodiment 25, wherein the one or more processors are further configured to determine a subframe boundary based on the decoded synchronization signal.

Embodiment 27 includes the apparatus of the User Equipment (UE) according to embodiments 20 or 21, wherein the Synchronization Signals (SS) include a Primary Synchronization Signal (PSS).

Embodiment 28 includes the apparatus of the User Equipment (UE) according to embodiment 27, wherein the Synchronization Signals (SS) further include a Secondary Synchronization Signal (SSS).

Embodiment 29 includes the apparatus of the User Equipment (UE) according to embodiment 28, wherein the Synchronization Signals (SS) further include a Tertiary Synchronization Signal (TSS).

Embodiment 30 includes the apparatus of the User Equipment (UE) according to embodiment 27, wherein the Synchronization Signals (SS) further include a Physical Broadcast Channel (PBCH).

Embodiment 31 include the apparatus of the User Equipment (UE) according to embodiment 20, wherein synchronization signal blocks are consecutive within a synchronization signal burst.

Embodiment 32 includes an apparatus of a Base Station (BS) of a millimeter wave new radio system operable to synchronize communication with one or more User Equipment (UE), the Base Stations (BS) comprising: a memory interface configured to access synchronization parameters in a memory; and one or more processors configured to encode Synchronization Signals (SS), based on the accessed synchronization parameters, for periodic transmission in one or more synchronization signal blocks, where multiple synchronization signal blocks in series form a synchronization signal burst, and where multiple synchronization signal bursts form a synchronization signal burst set.

Embodiment 33 includes the apparatus of the Base Station (BS) according to embodiment 32, where the synchronization signal burst has a predetermined periodicity.

Embodiment 34 includes the apparatus of the Base Station (BS) according to embodiments 32 or 33, wherein the synchronization signal burst set has a predetermined duration.

Embodiment 35 includes the apparatus of the Base Station (BS) according to embodiment 34, wherein synchronization signal busts include a same number of synchronization signal blocks such that the predetermined periodicity between two synchronization signal blocks is a fixed interval.

Embodiment 36 includes the apparatus of the Base Station (BS) according to embodiments 32 or 33, wherein the Synchronization Signals (SS) includes a Primary Synchronization Signal (PSS).

Embodiment 37 includes the apparatus of the Base Station (BS) according to embodiment 36, wherein the Synchronization Signals (SS) further includes a Secondary Synchronization Signal (SSS).

Embodiment 38 includes the apparatus of the Base Station (BS) according to embodiment 37, wherein the Secondary Synchronization Signal (SSS) is not repeated with the duration of the synchronization signal burst set.

Embodiment 39 includes the apparatus of the Base Station (BS) according to embodiment 37, wherein the Synchronization Signals (SS) further includes a Tertiary Synchronization Signal (TSS).

Embodiment 40 includes the apparatus of the Base Station (BS) according to embodiment 39, wherein the Tertiary Synchronization Signal (TSS) is not repeated with the duration of the synchronization signal burst set.

Embodiment 41 includes the apparatus of the User Equipment (UE) according to embodiment 36, wherein the Synchronization Signals (SS) further include a Physical Broadcast Channel (PBCH).

Embodiment 42 includes the apparatus of the Base Station (BS) according to embodiments 32 or 33, wherein the same beams are utilized in one or more instance of synchronization signal blocks within the synchronization signal bust set duration.

Embodiment 43 includes the apparatus of the Base Station (BS) according to embodiments 32 or 33, wherein a time gap is included between consecutive synchronization signal blocks within the synchronization signal bursts.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

The invention claimed is:

1. A method for a base station, the method comprising:
   encoding, at the base station, a synchronization signal burst set comprising a plurality of bursts of synchronization signal blocks (SSBs) in series, wherein the plurality of bursts of SSBs includes a primary synchronization signal (PSS) and a secondary synchronization signal (SSS), and wherein the SSS is not repeated with the synchronization signal burst set that is within a synchronization signal burst set duration; and
   beam sweeping based on the plurality of bursts of SSBs within the synchronization signal burst set.

2. The method of claim 1, wherein the synchronization signal burst set is within the synchronization signal burst set duration comprising a predetermined value for the base station and one or more user equipment.

3. The method of claim 2, further comprising using a same beam in one or more instance of the plurality of bursts of SSBs within the synchronization signal burst set that is within the synchronization signal burst set duration.

4. The method of claim 1, wherein the beam sweeping comprises using a number of beams for the SSS that are different in different instances of the plurality of bursts of SSBs within the synchronization signal burst set.

5. The method of claim 4, further comprising repeating a group of the plurality of bursts of SSBs across a plurality of the synchronization signal burst set.

6. The method of claim 1, wherein the plurality of bursts of SSBs has a predetermined periodicity.

7. The method of claim 1, wherein each of the plurality of bursts of SSBs includes a same number of SSBs such that a predetermined periodicity between two of the plurality of bursts of SSBs is a fixed interval.

8. The method of claim 1, wherein a relative transmission timing of the plurality of bursts of SSBs is the same between two of the plurality of bursts of SSBs.

9. The method of claim 1, wherein an interval between a starting time of consecutive ones of the plurality of bursts of SSBs is fixed.

10. A base station, comprising:
    one or more processors to encode, at the base station, a synchronization signal burst set comprising a plurality of bursts of synchronization signal blocks (SSBs) in series, wherein the plurality of bursts of SSBs includes a primary synchronization signal (PSS) and a secondary synchronization signal (SSS), and wherein the SSS is not repeated with the synchronization signal burst set that is within a synchronization signal burst set duration; and
    a transceiver to beam sweep based on the plurality of bursts of SSBs within the synchronization signal burst set.

11. The base station of claim 10, wherein the synchronization signal burst set is within the synchronization signal burst set duration comprising a predetermined value for the base station and one or more user equipment.

12. The base station of claim 11, wherein the transceiver is further to transmit a same beam in one or more instance of the plurality of bursts of SSBs within the synchronization signal burst set that is within the synchronization signal burst set duration.

13. The base station of claim 10, wherein the transceiver performs the beam sweep by transmitting a number of beams for the SSS that are different in different instances of the plurality of bursts of SSBs within the synchronization signal burst set.

14. The base station of claim 13, wherein the one or more processors are further configured to repeat a group of the plurality of bursts of SSBs across a plurality of the synchronization signal burst set.

15. The base station of claim 10, wherein the plurality of bursts of SSBs has a predetermined periodicity.

16. The base station of claim 10, wherein each of the plurality of bursts of SSBs includes a same number of SSBs such that a predetermined periodicity between two of the plurality of bursts of SSBs is a fixed interval.

17. The base station of claim 10, wherein a relative transmission timing of the plurality of bursts of SSBs is the same between two of the plurality of bursts of SSBs.

18. The base station of claim 10, wherein an interval between a starting time of consecutive ones of the plurality of bursts of SSBs is fixed.

* * * * *